United States Patent
Lehtimaki et al.

(10) Patent No.: US 7,193,990 B2
(45) Date of Patent: Mar. 20, 2007

(54) TELECOMMUNICATION NETWORK AND ROUTING METHOD

(75) Inventors: Matti Lehtimaki, Espoo (FI); Jyri Suvanen, Helsinki (FI)

(73) Assignee: Nokia Corporation, Espoo (FI)

( * ) Notice: Subject to any disclaimer, the term of this patent is extended or adjusted under 35 U.S.C. 154(b) by 677 days.

(21) Appl. No.: 10/006,791

(22) Filed: Dec. 6, 2001

(65) Prior Publication Data

US 2002/0085512 A1    Jul. 4, 2002

Related U.S. Application Data

(63) Continuation of application No. PCT/EP99/04520, filed on Jun. 30, 1999.

(51) Int. Cl.
*H04L 12/66* (2006.01)
(52) U.S. Cl. .................................. 370/352
(58) Field of Classification Search ........ 370/351–356, 370/401, 420
See application file for complete search history.

(56) References Cited

U.S. PATENT DOCUMENTS

| | | | |
|---|---|---|---|
| 5,457,680 A * | 10/1995 | Kamm et al. ............ | 370/332 |
| 5,461,669 A | 10/1995 | Vilain | |
| 5,533,019 A * | 7/1996 | Jayapalan ................ | 370/352 |
| 5,729,536 A * | 3/1998 | Doshi et al. ............. | 370/398 |
| 5,745,477 A * | 4/1998 | Zheng et al. ............ | 370/230 |
| 6,038,452 A * | 3/2000 | Strawczynski et al. ... | 455/446 |
| 6,088,431 A * | 7/2000 | LaDue .................... | 379/114.2 |
| 6,119,012 A * | 9/2000 | Amirijoo ................. | 455/456.1 |
| 6,198,920 B1 * | 3/2001 | Doviak et al. ........... | 455/426.1 |
| 6,226,523 B1 * | 5/2001 | Karlsson et al. ......... | 455/466 |
| 6,295,457 B1 * | 9/2001 | Narayanaswamy ....... | 455/466 |
| 6,353,607 B1 * | 3/2002 | Valentine et al. ........ | 370/349 |
| 6,389,008 B1 * | 5/2002 | Lupien et al. ........... | 370/352 |
| 6,463,055 B1 * | 10/2002 | Lupien et al. ........... | 370/353 |
| 6,496,690 B1 * | 12/2002 | Cobo et al. .............. | 455/408 |
| 6,798,771 B1 * | 9/2004 | Low et al. ............... | 370/353 |

FOREIGN PATENT DOCUMENTS

| | | |
|---|---|---|
| WO | 9716933 | 5/1996 |
| WO | 9827698 | 6/1998 |
| WO | 0103453 | 1/2001 |

OTHER PUBLICATIONS

UMTS 23.01 V 1.0.0 (Sep. 1998) standard, pp. 1-13.*
"Architecture for Interworking Data Over PCS" IEEE Communications Magazine, US ISEE Service Center, NJ, vol. 34, No. 9 Sep. 1, 1995, pp. 124-130.

* cited by examiner

*Primary Examiner*—Dmitry Levitan

(57) ABSTRACT

A telecommunication network and a routing method, wherein user data are routed via an access network (2) to a gateway device (5) of a core network (7) connected to the access network (2) via a first interface. The control of the gateway device (5) is performed by supplying a control information from the core network (7) to the gateway device (5) via a second interface, and the user data are routed directly between the access network (2) and the gateway device (5) via the first interface. Thus, the user data are routed directly from the access network (2) to the gateway (5), whereas the control can be performed via a dedicated and open control interface. Processing resources can be shared between several applications and trunking gains can be utilized. Furthermore, real-time transport capabilities can be provided by a simple method of connecting the Internet to the mobile network.

30 Claims, 3 Drawing Sheets

TELECOMMUNICATION NETWORK AND ROUTING METHOD

CROSS-REFERENCE TO RELATED APPLICATION

This application is a continuation of International Application PCT/EP99/04520 having an international filing date of Jun. 30, 1999 and from which priority is claimed under all applicable sections of Title 35 of the United States Code including, but not limited to, Sections 120, 363 and 365(c).

FIELD OF THE INVENTION

The present invention relates to a telecommunication network and a method for routing user data via an access network to a gateway device of a core network such as a third generation core network based on the GSM technology.

BACKGROUND OF THE INVENTION

Third generation mobile telecommunications systems aim at providing end-users, apart from terminal and personal mobility, with enhanced services. Compared to second generation systems, enhancements that will cover features all the way between the end-user and the core network elements are required, i.e. from mobile terminals to radio access and fixed networks. As an example, the Universal Mobile Telecommunications System (UMTS) is a third generation system which assumes a B-ISDN core network.

Significantly, utilization of existing technologies gives rise to numerous issues concerning the protocols employed. The most essential aspect requiring further investigation is how protocol specification effort can be minimized by re-using existing protocols and functionality while preserving the functional specifications and performance goals that UMTS is setting. The UMTS concept is being developed and will be integrated with the International Telecommunication Union (ITU) as a proposal for an IMT-2000 standard. UMTS/IMT-2000 will provide ubiquitous wireless access to next-generation personalized services wherever suitable frequencies are available. Global Systems for Mobile Communication (GSM) operators have several options for delivering enhanced services. For example, they may use GSM in the existing frequency spectrum to deliver UMTS/IMT-2000-capable services, they may use GSM and WCDMA (Wideband Code Division Multiple Access) in the existing spectrum or they may use GSM and WCDMA in the existing spectrum combined with WCDMA in a new 2 GHZ UMTS/IMT-2000 spectrum. All approaches offer low entry costs, a high degree of investment flexibility, since roll out can take place in line with market demand, as well as extensive reuse of existing GSM equipment. Not only does WCDMA offer full backwards compatibility with GSM, it fully draws on GSM as the core network, including well-proven GSM functionality.

FIG. 1 shows a diagram of network components of third generation (3G) mobile networks (UMTS, IMT-2000) and the corresponding interfaces used for connecting the network components. According to FIG. 1, a GSM network 10 is connected via an Ater interface to a third generation core network 7. The third generation core network 7 can be based on GSM technology, i.e. it may comprise a GSM mobile switching center (MSC). In this case, the same MSC can handle both GSM and 3G radio access networks via an open A interface.

A 3G radio access network (3G RAN) 2 is connected via an Iu interface (the interface between the radio network controller—RNC- and the core network as specified by the 3G standards) to the core network 7. Thus, in case a GSM MSC is used in the core network 7, the Iu interface must be adapted through an interworking unit (IWU) to the A interface of the GSM MSC. Furthermore, transcoders (TCs) (not shown) are located at the core network sides of the Ater interface and the ATM based Iu interface, wherein speech is transmitted in coded format over these interfaces. The TCs adapt the respective coding of the Ater interface and the Iu interface to the coding required for the open A interface of the core network 7. The TC arranged between the Iu interface and the A interface is a 3G TC and may be located in the IWU or may be part of the radio network controller (RNC) provided in the 3G RAN 2. In the latter case, an Iu interface is not provided. Another possibility is to provide a dedicated 3G MSC for the 3G RAN 2.

The core network 7 is connected via an ISUP (ISDN Signaling User Part) interface to a PSTN (Public Switched Telephone Network) and an ISDN (Integrated Services Digital Network). The ISUP interface provides the required ISDN call set up and control functions. Furthermore, the core network 7 is connected via a TCP/IP (Transmission Control Protocol/Internet Protocol) interface to the Internet.

Accordingly, the Internet, PSTN or ISDN can be accessed from the cellular GSM or 3G RAN networks 10 and 2 via the common core network 7 by means of a usual GSM mobile station (MS) 1a, a MS 1b having a GSM and a 3G capability, and a 3G MS 1c with enhanced third generation capabilities.

In addition to the above transcoding function, the core network 7 may comprise additional adaptation functions, for example modems and video codecs. However, similar to the TCs, these signal processing functions have to be separately provided at each access network interface, such that an increased number of network resources is required.

On the other hand, the interconnections to other networks currently require to offer real-time transport capabilities via IP (Internet Protocol) based interfaces. Therefore, interconnecting devices, typically called gateways (GW), are required, which further increase the number of network resources. Thus, a simple method for connecting mobile networks to IP based networks is required. Moreover, it would be beneficial to have an open interface between network controlling devices such as the MSC and actual user-plane processing functions.

SUMMARY OF THE INVENTION

It is therefore an object of the present invention to provide a telecommunication network by means of which network resources required for connecting mobile networks to other networks can be saved.

This object is achieved by telecommunication network having at least one access network, a core network connected to the access network via a first interface, and at least one terminal device, wherein the core network comprises at least one access network control device adapted to control at least one gateway device via a second interface by transmitting a control information; and wherein the telecommunication network is adapted to route user data directly between the access network and one gateway device via the first interface.

Additionally, the above object is achieved by a method for routing user data via an access network to a gateway device of a core network connected to the access network via a first interface, comprising the steps of:

controlling the gateway device by supplying a control information from the core network to the gateway device via a second interface; and routing the user data directly between the access network and the gateway device via the first interface.

Accordingly, since the user data is directly routed between the access network and the gateway device via the first interface, processing resources required for transcoding and other data processing functions can be shared between several applications. Thereby, trunking gains can be utilized. The control is performed by the access network controlling entity, e.g. the MSC, via a dedicated and open control interface. This way, the access network controlling entity may control the resources efficiently and over long distances. Hence, according to the invention, substantial savings in the resources can be achieved, if all user-plane processing functions can be co-located in the gateway entity of a 3G mobile network. Thus, control and user planes can be separated.

The first interface may be connected via a transmission network directly from the access network to a gateway device.

A second possibility is to connect the second interface via a transmission network and another access network control device to the gateway device.

A third possibility is to connect the second interface via the access network and the first interface to the gateway device. In this case, the control for the gateway device is transmitted together with the user data, i.e. in-band, and an out-band control is provided between the access network control device and the access network. Then, the access network maps the out-band control information into an in-band information.

Preferably, the second interface may be adapted to use the ISUP protocol or the MGCP (Media Gateway Control Protocol). The first interface may be an Iu interface.

Preferably, the user data may comprise real-time data, such as speech, audio and/or video data. In this case, the user data may be transmitted using the RTP (Real-Time Protocol). Thereby, real-time audio and video information can be transmitted or received via the Internet.

Preferably, the user data may be routed via a packet network, such as an ATM network or an IP network. The control information may be transmitted via a TDMA network or also a packet network such as the ATM or IP network.

Preferably, the access network control unit is a mobile switching center.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the telecommunication network and routing method according to the present invention will be described on the basis of 3G mobile networks.

Figure 1:
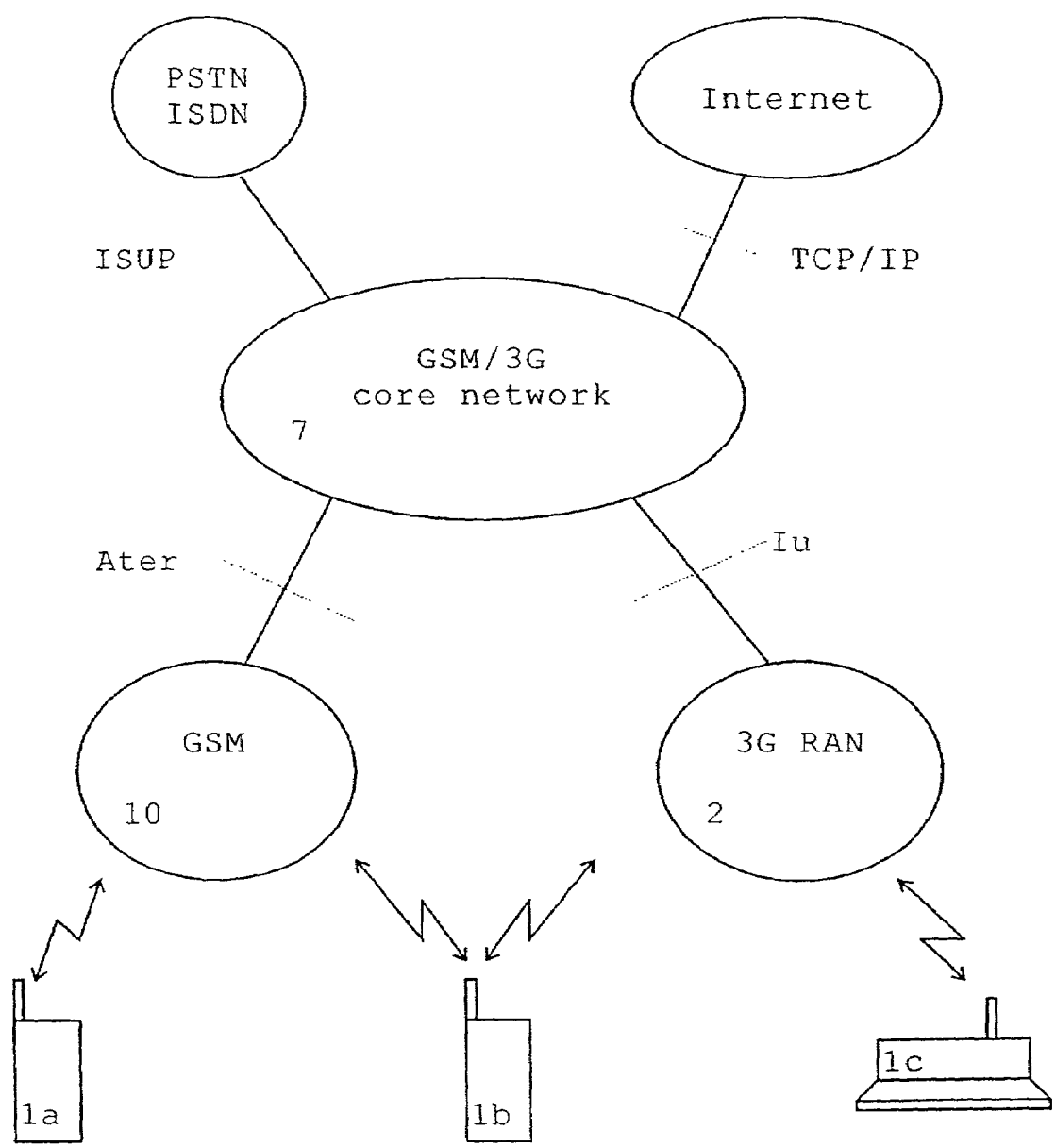
FIG. 1 shows a diagram of a telecommunication network comprising cellular networks connected to fixed networks.
Figure 2:
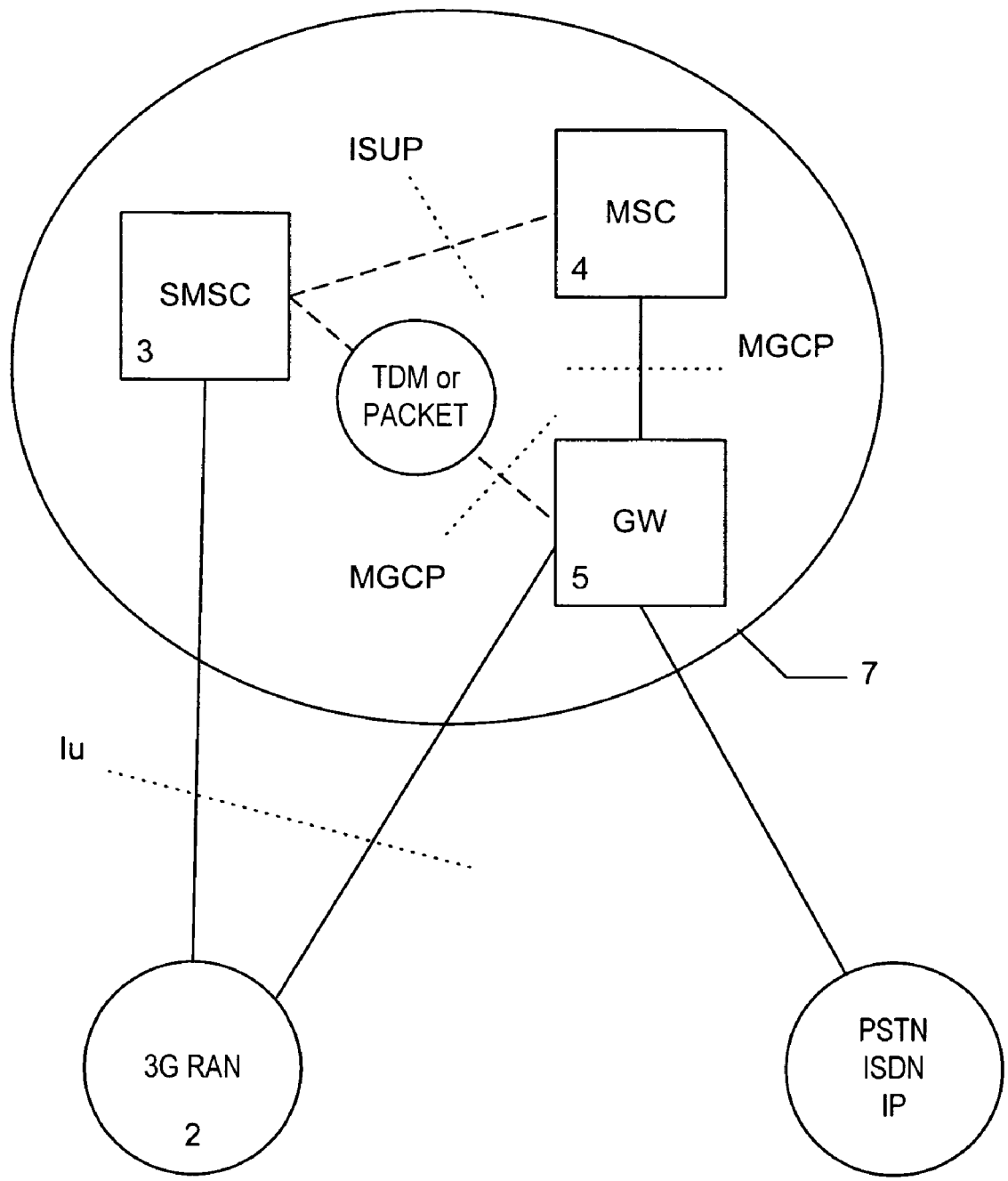
FIG. 2 shows a block diagram of a core network according to the preferred embodiment of the present invention.

FIG. 2 shows a block diagram of the GSM/3G core network 7 according to FIG. 1, which comprises a gateway device GW 5 connected to a fixed network such as the PSTN, ISDN or Internet. The 3G RAN 2 is connected via an Iu interface to a serving MSC (SMSC) 3 arranged for serving the 3G RAN 2. Furthermore, the 3G RAN 2 is directly connected via an Iu interface and a transmission network to the GW 5. The SMSC 3 of the core network 7 performs control so as to route user data directly from the 3G RAN 2 to the GW 5. The GW 5 is controlled by the SMSC 3 via a dedicated and open control interface. Furthermore, the GW 5 is connected via an MGCP interface to another MSC 4 which may be a serving or non-serving MSC. The GW 5 can be located separately or can be integrated into the MSC 4.

In particular, the GW 5 is a network element which provides conversion between the audio signals carried on telephone circuits and data packets carried over the Internet or other packet networks. The GW 5 may be a trunking gateway which provides an interface between the telephone network and a Voice over IP network, a Voice over ATM gateway which interfaces to an ATM network, a residential gateway which provides a traditional analog interface to a Voice over IP network, an access gateway which provides a traditional analog or digital PBX (Private Branch Exchange) interface to a Voice over IP network, a business gateway which provides a traditional digital PBX interface or an integrated "soft PBX" interface to a Voice over IP network, a network access server which can attach a modem to a telephone circuit and provide data access to the Internet, or circuit switches or packet switches which can offer a control interface to an external control element.

The MGCP interface is an interface arranged for controlling GW devices from external control elements. The MGCP assumes a call control architecture where the call control "intelligence" is outside the gateways and handled by external call control elements. The MGCP assumes that these call control elements, or call agents will synchronize with each other to send coherent commands to the gateways under their control. MGCP does not define a mechanism for synchronizing call agents. MGCP is, in essence, a master/slave protocol, where the gateways are expected to execute commands sent by the call agents, i.e. the SMSC 3. The MGCP is designed as an internal protocol within a distributed system that appears to the outside as a single VoIP (Voice over Internet) gateway.

According to the preferred embodiment, the user data can be routed to the GW 5 through a separate network different from the one used for the control information. The separate network may be a packet network such an ATM network or an IP network. The control signaling may use a Time Division Multiplex (TDM) or packet network, such as the user-plane ATM network or an IP network. Therefore, the SMSC 3 remains purely as an entity handling the control plane, such that TCs are no longer required between MSCs and radio access networks connected to the core network 7. The control signaling may be performed via packet network such as an IP network.

In the following, three examples for controlling the GW 5 by the SMSC 3 are described on the basis of FIGS. 2 and 3.

Figure 3:
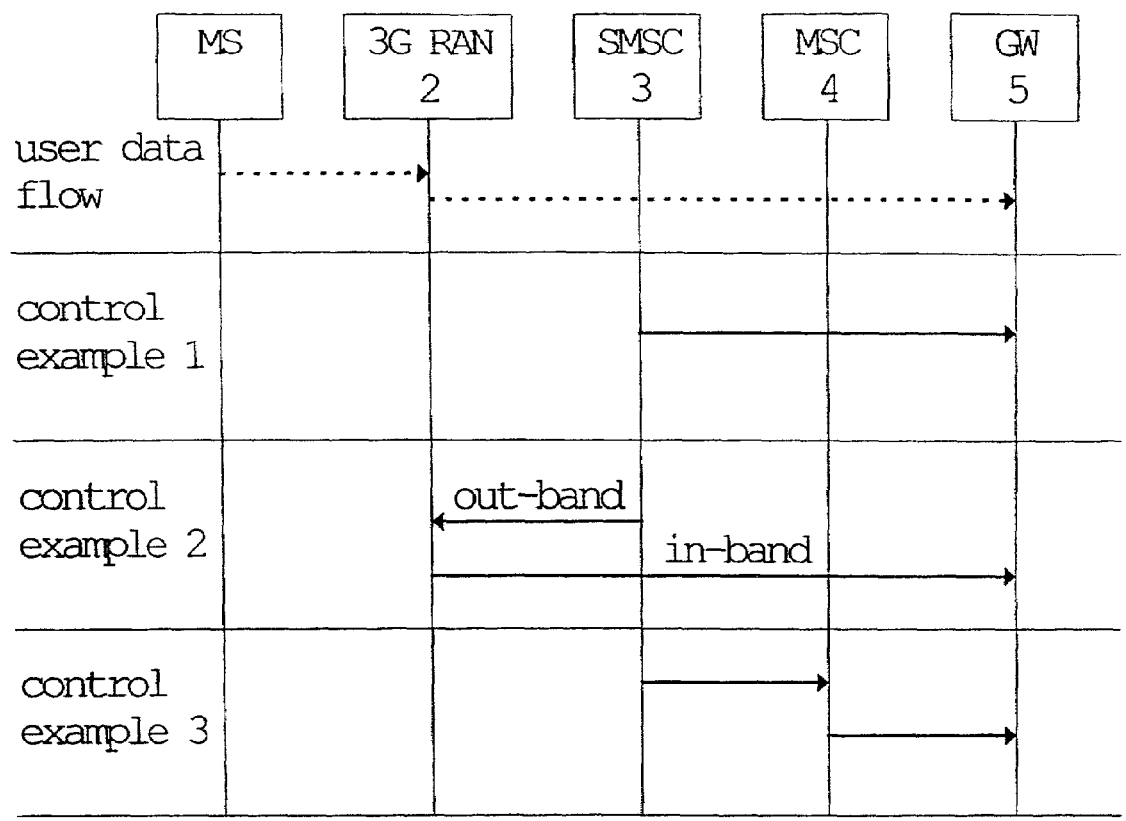
FIG. 3 shows a diagram indicating information flows between network components, according to three examples of the preferred embodiment.

FIG. 3 shows an information flow diagram in which data and control information flows are shown by corresponding arrows, wherein each row corresponds to a separate transmission case and wherein an upper arrow indicates an earlier transmission.

In the upper (first) row of FIG. 3, the user data flow between a mobile station (MS) and the GW 5 is indicated. The user data, such as real-time speech, audio, and/or video data are transmitted via a corresponding radio interface from the MS to the RAN 2. Subsequently, the user data are directly routed from the 3G RAN 2 to the GW 5 via the Iu interface. Thereby, a transcoding function between the 3G RAN 2 and the SMSC 3 is not required. The data processing functions, such as transcoding, modems, video codex and the like can be provided centrally at the GW 5.

In the second row of FIG. 3, a first example for supplying the control information from the SMSC 3 to the GW 5 is shown. In this case, the SMSC 3 is connected via a MGCP interface to the GW 5 (cf. lower dotted line in FIG. 2). Thus, in this example, the control signaling is directly transmitted from the SMSC 3 to the GW 5. Accordingly, a separate control plane connection is required between the SMSC 3 and the GW 5. It is noted that any other suitable control protocol could be used for controlling the GW 5.

A second control example is shown in the third row of FIG. 3. In this example, a separate in-band control signaling is performed between the 3G RAN 2 and the GW 5. Thus, in case there is no own control plane provided between the 3G RAN 2 and the GW 5 (for example an MGCP connection), a dedicated resource is required for the 3G RAN 2. Alternatively, resources can be allocated in the GW 5 based on the in-band signaling received from the 3G RAN 2. Additionally, an out-band control interface is provided between the SMSC 3 and the 3G RAN 2, wherein the 3G RAN 2 maps the out-band control information to the in-band control information submitted to the GW 5.

A third example is shown in the fourth row of FIG. 3, where the SMSC 3 controls the GW 5 via the other MSC 4 connected to the GW 5. In this option, a control-plane is required between the SMSC 3 and the MSC 4. This can be achieved e.g. by an updated ISUP interface, as shown by the upper dotted line in FIG. 2. In this case, the MSC 4 controlling the GW 5 can map the control information received via the ISUP interface to the MGCP used for controlling the GW 5. Alternatively, a known method can be used by the MSC 4 for converting the control information.

In summary, the present invention relates to a telecommunication network and a routing method, wherein user data are routed via an access network to a gateway device of a core network connected to the access network via a first interface. The control of the gateway device is performed by supplying a control information from the core network to the gateway device via a second interface, and the user data are routed directly between the access network and the gateway device via the first interface. Thus, the user data are routed directly from the access network to the gateway, whereas the control can be performed via a dedicated and open control interface. Thereby, processing resources can be shared between several applications and trunking gains can be utilized. Furthermore, real-time transport capabilities can be provided by a simple method of connecting the Internet to the mobile network.

It is to be pointed out that the telecommunication network and routing method described in the above preferred embodiment can be applied to any access network which is connected via a core network to a gateway device. In particular, the core network and the access network may be any kind of telecommunication network, and is thus not restricted to a cellular or mobile network. Furthermore, any suitable access network control entity can be used for controlling the GW 5. The above description of the preferred embodiment and the accompanying drawings are only intended to illustrate the present invention. The preferred embodiment of the invention may thus vary within the scope of the attached claims.

The invention claimed is:

1. A telecommunication network comprising:
   at least one radio access network,
   a core network, and
   at least one terminal device,
   wherein said core network includes at least one gateway device,
   wherein said core network includes at least one serving network control device configured to serve the at least one radio access network and provide serving functions including call setup and call control functions, and further configured to control said at least one gateway device by transmitting a control information to the gateway device,
   wherein the gateway device is non-serving,
   wherein said radio access network is directly connected to the gateway device via a first interface,
   wherein a second interface is connected between the network control device and the gateway device, the control information being transmitted from the network control device to the gateway device via said second interface,
   wherein said telecommunication network is configured to route user data directly, without being transmitted through the network control device, between said radio access network and said at least one gateway device via said first interface, achieving substantial separation of a control plane from a user plane; and
   wherein the gateway device is configured to provide conversion between audio signals carried on telephone circuits and data packets carried over the Internet or other packet networks.

2. A telecommunication network according to claim 1, wherein said first interface is connected directly from said radio access network to said gateway device.

3. A telecommunication network according to claim 1, wherein said second interface is connected to said gateway device.

4. A telecommunication network according to claim 1, wherein said user data comprises real-time data.

5. A telecommunication network according to claim 4, wherein said user data comprises at least one of speech, audio, and video data.

6. A telecommunication network according to claim 5, wherein said user data is transmitted using a real time protocol.

7. A telecommunication network according to claim 1, wherein said second interface is adapted to use a signaling user part protocol.

8. A telecommunication network according to claim 1, wherein said second interface is adapted to use a media gateway control protocol.

9. A telecommunication network according to claim 1, wherein said user data is routed via a packet network.

10. A telecommunication network according to claim 9, wherein said packet network is an asynchronous transfer mode network.

11. A telecommunication network according the claim 9, wherein said packet network is an internet protocol network.

12. A telecommunication network according to claim 1, wherein said control information is transmitted via a time division multiplexing network.

13. A telecommunication network according to claim 1, wherein said control information is transmitted via a packet network.

14. A telecommunication network according to claim 13, wherein said packet network is an asynchronous transfer mode network.

15. A telecommunication network according to claim 13, wherein said packet network is internet protocol network.

16. A telecommunication network according to claim 1, wherein said telecommunication network is part of a universal mobile telecommunication system.

17. A telecommunication network according to claim 1, wherein said network control device is a mobile switching center.

18. A telecommunication network according to claim 1, wherein said first interface is an Iu interface.

19. A method, comprising:
routing user data via a radio access network to a non-serving gateway device of a core network having at least one serving network control device that serves the radio access network, wherein the user data is routed directly, without being transmitted through the network control device, between said radio access network and said gateway device via a first interface so that there is substantial separation of a control plane from a user plane, and wherein the core network also has a second interface connected between the network control device and the gateway device; and
controlling said gateway device by transmitting control information from said network device to said gateway device via a second interface;
wherein said radio access network is directly connected to the gateway device via the first interface,
wherein the network control device provides serving functions including call setup and call control functions, and
wherein the gateway device provides conversion between audio signals carried on telephone circuits and data packets carried over the Internet or other packet networks.

20. A method according to claim 19, wherein said control information is supplied via said second interface to said radio access network, and subsequently the control information is supplied together with said user data, via said first interface, to said gateway device.

21. A method according to claim 19, wherein said control information is supplied via a network control device.

22. A method according to claim 19, wherein a signaling user part protocol is used in said second interface.

23. A method according to claim 19, wherein a media gateway control protocol is used in said second interface.

24. A method according to claim 19, wherein said first interface is an Iu interface.

25. Apparatus comprising:
a first interface configured to receive user data directly from a radio access network without being transmitted through a core network, so that there is substantial separation between a control plane and a user plane;
a second interface configured to receive control information from at least one serving network control device in the core network;
wherein the network control device is configured to serve the radio access network and is configured to provide serving functions including call setup and call control functions,
wherein said radio access network is directly connected to the apparatus via the first interface, and
wherein the apparatus is a non-serving gateway device configured to provide conversion between audio signals carried on telephone circuits and data packets carried over the Internet or other packet networks.

26. The gateway device of claim 25, wherein said user data comprises real-time data.

27. The gateway device of claim 25, wherein said user data comprises at least one of speech, audio, and video data.

28. Apparatus comprising:
first means, for receiving user data directly from a radio access network without being transmitted through a core network, so that there is substantial separation between a control plane and a user plane,
second means, for receiving control information from at least one serving network control device in the core network;
wherein the network control device is configured to serve the radio access network and is configured to provide serving functions including call setup and call control functions,
wherein said radio access network is directly connected to the apparatus via the first means, and
wherein the apparatus is a non-serving gateway device configured to provide conversion between audio signals carried on telephone circuits and data packets carried over the Internet or other packet networks.

29. The apparatus of claim 28, wherein said user data comprises real-time data.

30. The apparatus of claim 28, wherein said user data comprises at least one of speech, audio, and video data.

* * * * *